(12) United States Patent
Koskinen

(10) Patent No.: US 8,588,127 B2
(45) Date of Patent: Nov. 19, 2013

(54) APPARATUS AND METHOD FOR ALLOCATION OF SUBFRAMES ON A MIXED CARRIER

(75) Inventor: Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 410 days.

(21) Appl. No.: 12/934,919

(22) PCT Filed: Mar. 27, 2009

(86) PCT No.: PCT/IB2009/005104
§ 371 (c)(1),
(2), (4) Date: Sep. 27, 2010

(87) PCT Pub. No.: WO2009/118640
PCT Pub. Date: Oct. 1, 2009

(65) Prior Publication Data
US 2011/0013554 A1    Jan. 20, 2011

Related U.S. Application Data

(60) Provisional application No. 61/040,138, filed on Mar. 27, 2008.

(51) Int. Cl.
*H04J 1/10* (2006.01)
(52) U.S. Cl.
USPC .......................................... 370/315; 370/329
(58) Field of Classification Search
USPC ......... 370/315, 208, 344, 328, 329, 389, 431, 370/433, 338, 468, 470, 471, 436, 473; 375/130, 140
See application file for complete search history.

(56) References Cited

U.S. PATENT DOCUMENTS

| 6,697,364 | B1 * | 2/2004 | Kekki et al. ................... 370/389 |
| 7,796,639 | B2 * | 9/2010 | Buckley et al. ............... 370/465 |
| 2008/0049690 | A1 | 2/2008 | Kuchibhotla et al. | |

OTHER PUBLICATIONS

International Search Report and Written Opinion of the International Searching Authority from corresponding PCT Application No. PCT/IB2009/005104, dated Jul. 28, 2009, 12 pages.
3GPP Tdoc R2-080198, Signaling of MBSFN subframe allocations, Alcatel-Lucent, Jan. 2008.
3GPP TSG-RAN-WG1 R1-071690, MBSFN Subframe Indication, Huawei, Mar. 2007.
3GPP TSG-RAN-WG1 R1-072963, Signalling of MBSFN Subframe Allocation in D-BCH, Nokia Siemens Networks et al., Jun. 2007.
3GPP TSG-RAN-WG1 R1-080210, Signaling of MBSFN Subframe Allocations, Alcatel-Lucent, Jan. 2008.
3GPP TSG-RAN-WG1 R2-080839, MSAP and MBSFN Subframe Allocating Signalling, Huawei, Feb. 2008.

(Continued)

*Primary Examiner* — Chi Pham
*Assistant Examiner* — Alexander O Boakye
(74) *Attorney, Agent, or Firm* — Mintz, Levin, Cohn, Ferris, Glovsky & Popeo, P.C.

(57) ABSTRACT

Methods and apparatus, including computer program products, are provided for allocating subframes of a mixed carrier. In one aspect, there is provided a method. The method may include allocating subframes within radio frames transmitted to a user element. Moreover, the method may include transmitting, to the user element, a message comprising an indication of the allocation. The indication may be representative of the allocation within the subframes of consecutive radio frames, without the indication identifying the radio frames including the allocated subframes. Related apparatus, systems, methods, and articles are also described.

19 Claims, 11 Drawing Sheets

(56) References Cited

OTHER PUBLICATIONS

3GPP TSG-RAN-WG1 R2-080982, Constraints on Signalling of MBSFN Subframe Allocations, Alcatel-Lucent, Feb. 2008.
3GPP TSG-RAN-WG1 R2-081482, Signalling of the MBSFN Subframe Allocation Parameter, Ericsson, Mar. 2008.
3GPP TSG-RAN-WG1 R2-081889, MBSFN Subframe Allocating Signalling, Huawei, Apr. 2008.
3GPP TSG-RAN WG1 Meeting #49bis, R1-072963, "Signaling of MBSFN Subframe Allocation in D-BCH", Nokia Siemens Networks, Nokia, Huawei, Jun. 29, 2007.
3GPP TSG-RAN WG1 #51bis, R1-080210, "Signaling of MBSFN Subframe Allocations", Alcatel-Lucent, Jan. 18, 2007.
3GPP TSG-RAN WG2 #61, R2-080875, "MBMS scheduling information and paging occasion relating to MBSFN Subframe Allocation", Panasonic, Feb. 11-15, 2008.

* cited by examiner

APPARATUS AND METHOD FOR ALLOCATION OF SUBFRAMES ON A MIXED CARRIER

RELATED APPLICATION

This application was originally filed as PCT Application No. PCT/IB2009/005104 filed Mar. 27, 2009, which claims priority benefit to U.S. Provisional Patent Application No. 61/040,138, filed Mar. 27, 2008.

TECHNICAL FIELD

The present application relates generally to multimedia broadcast/multicast service (MBMS) and communication networks supporting such services.

BACKGROUND

In recent years, mobile broadcast and multicast solutions have been standardized by different organizations, such as the 3rd Generation Partnership Project (3GPP) MBMS service. In one aspect, MBMS is a broadcasting multicasting service that may be offered via existing Global Universal Mobile Telecommunication System (UMTS) and/or possibly System for Mobile Communications (GSM) cellular networks. 3GPP MBMS provides the ability to multicast or broadcast data to 3GPP terminals in a cost efficient manner.

3GPP has defined MBMS for the simultaneous delivery of multimedia content to a large set of receivers or user equipments (UEs). A set of MBMS specifications have been published by 3GPP, covering different aspects of the service from the radio access to the content delivery applications and protocols. As part of 3GPP long term evolution (LTE), MBMS is being standardized for the purpose of supporting efficient broadcast services such as, for example, mobile TV services.

LTE MBMS supports an MBMS over a single frequency network (MBSFN) transmission mode. In MBSFN, each base station transmits the same content in a synchronized manner. Operating in this manner, MBSFN enables a highly efficient method of broadcasting, as the transmissions from different base stations reinforce each other instead of causing interference with each other.

In MBSFN, the coverage of data transmission is not limited by cell edge areas, as MBSFN provides a sufficient signal to interference-plus-noise ratio (SINR) gain. Therefore, the capacity of a channel, when delivered as MBSFN transmission, may be significantly larger than when using single-cell transmission.

MBSFN transmission takes place on dedicated subframes (e.g., given the one-millisecond time intervals that all LTE transmissions are divided into, a radio frame consists of ten subframes) referred to as MBSFN subframes, which differ from the regular LTE unicast subframes in that MBSFN subframes contain less pre-specified reference symbols that terminals measure to estimate the channel to the cell. Because of this difference, terminals typically avoid measuring a cell in subframes with the smaller density of reference symbols. For this reason, terminals, regardless of whether they intend to receive MBSFN, need to be made aware of which subframes in the cell are the ones with the reduced reference symbols. To this end, the MBSFN subframe allocation is transmitted in the system information of every cell that also transmits such special subframes.

SUMMARY

In one aspect, there is provided an apparatus, comprising a memory unit configured to store one or more subframes allocation patterns with a basic allocation period corresponding to multiple data frames, and information indicating data frames comprising at least one data subframe of at least one type. The apparatus comprises a receiver configured to receive data subframes of more than one type, and a processor configured to allocate the data subframes into data frames based at least in part on at least one of the one or more subframes allocation patterns, and information indicating data frames comprising at least one data subframe of at least one type.

In another aspect there is provided a method, comprising receiving data subframes of more than one type, and allocating the data subframes into data frames based at least in part on at least one of one or more subframes allocation patterns with a basic allocation period corresponding to multiple data frames, and information indicating data frames comprising at least one data subframe of at least one type.

In yet another aspect there is provided an apparatus, comprising a memory unit configured to store one or more subframes allocation patterns with a basic allocation period corresponding to multiple data frames, and information indicating data frames comprising at least one data subframe of at least one type. The apparatus comprises a receiver configured to receive data frames, and a processor configured to demultiplex data subframes in the data frames based at least in part on at least one of the one or more subframes allocation patterns, and information indicating data frames comprising at least one data subframe of at least one type.

In another aspect, there is provided a method, comprising receiving data frames with subframes of more than one type allocated in the data frames, and demultiplexing the data subframes in the data frames based at least in part on at least one of one or more subframes allocation patterns with a basic allocation period corresponding to multiple data frames, and information indicating data frames comprising at least one data subframe of at least one type.

In another aspect, there is provided a computer program product comprising a computer-readable medium bearing computer program code embodied therein for use with a computer, the computer program code comprising code for receiving data subframes of more than one type, and code for allocating the data subframes into data frames based at least in part on at least one of one or more subframes allocation patterns with a basic allocation period corresponding to multiple data frames, and information indicating data frames comprising at least one data subframe of at least one type.

In another aspect there is provided a computer program product comprising a computer-readable medium bearing computer program code embodied therein for use with a computer, the computer program code comprising code for receiving data frames with subframes of more than one type allocated in the data frames, and code for demultiplexing the data subframes in the data frames based at least in part on at least one of one or more subframes allocation patterns with a basic allocation period corresponding to multiple data frames, and information indicating data frames comprising at least one data subframe of at least one type.

In another aspect there is provided a method. The method may include allocating subframes within radio frames transmitted to a user element. Moreover, the method may include transmitting, to the user element, a message comprising an indication of the allocation. The indication may be representative of the allocation within the subframes of consecutive radio frames, without the indication identifying the radio frames including the allocated subframes.

In another aspect there is provided an apparatus comprising a processor and a memory, wherein the processor and memory are configured to provide a method comprising allocating subframes within radio frames transmitted to a user element; and transmitting, to the user element, a message comprising an indication of the allocation, the indication representative of the allocation within the subframes of consecutive radio frames, without the indication identifying the radio frames including the allocated subframes.

In another aspect there is provided a computer-readable storage medium including instructions to configure a processor to perform a method comprising allocating subframes within radio frames transmitted to a user element; and transmitting, to the user element, a message comprising an indication of the allocation, the indication representative of the allocation within the subframes of consecutive radio frames, without the indication identifying the radio frames including the allocated subframes.

In another aspect there is provided a method. The method may include receiving, at a user element, a message comprising an indication of a subframe allocation, the indication representative of the subframe allocation within the subframes of consecutive radio frames without the indication identifying the radio frames including the allocated subframes; and identifying, at the user element, the subframes allocated in radio frames, the identifying based on the indication.

In another aspect there is provided an apparatus comprising a processor and a memory, wherein the processor and memory are configured to provide a method comprising receiving, at a user element, a message comprising an indication of a subframe allocation, the indication representative of the subframe allocation within the subframes of consecutive radio frames without the indication identifying the radio frames including the allocated subframes; and identifying, at the user element, the subframes allocated in radio frames, the identifying based on the indication.

In another aspect there is provided a computer-readable storage medium including instructions to configure a processor to perform a method comprising receiving, at a user element, a message comprising an indication of a subframe allocation, the indication representative of the subframe allocation within the subframes of consecutive radio frames without the indication identifying the radio frames including the allocated subframes; and identifying, at the user element, the subframes allocated in radio frames, the identifying based on the indication.

Figure 1:
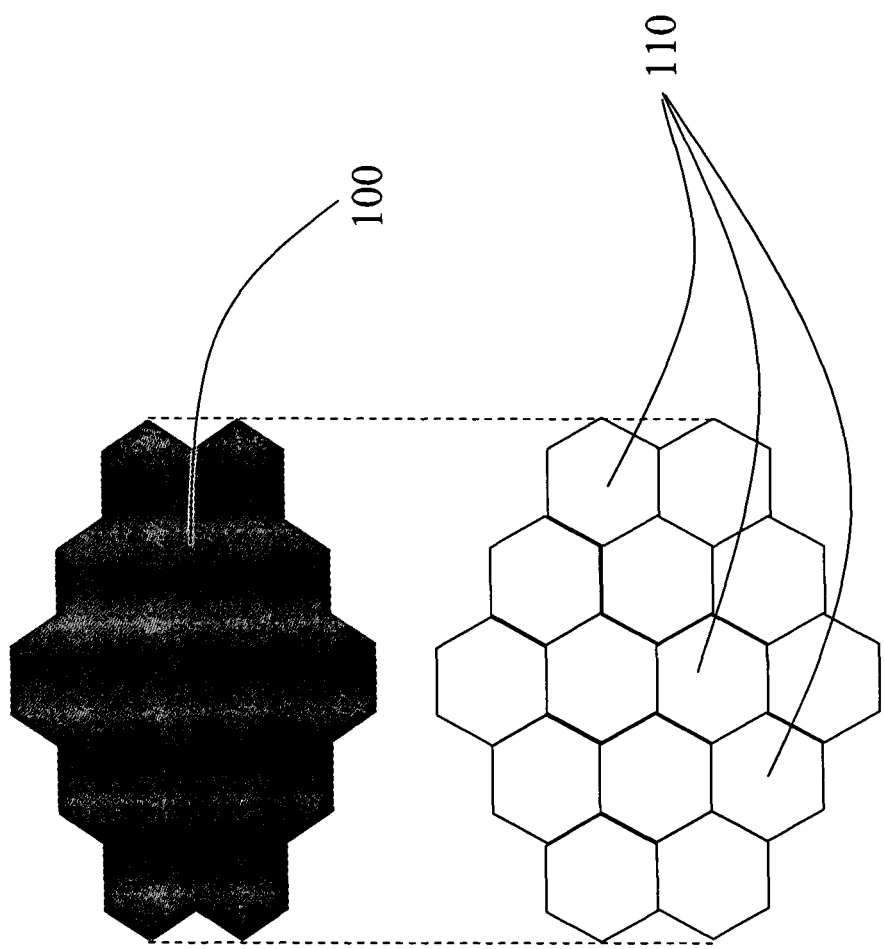
FIG. 1 depicts an example of a multicast/broadcast single frequency network (MBSFN) coverage area and multiple examples of single-cell transmission coverage areas.

Like labels are used to refer to same or similar items in the drawings.

DETAILED DESCRIPTION

FIG. 1 depicts an example of a multicast/broadcast single frequency network (MBSFN) coverage area and multiple examples of single-cell transmission coverage areas. For example, a multicast/broadcast single frequency network coverage area 100 is shown over a plurality of single-cell transmission local areas 110. In implementations using an MBSFN mode, a time-synchronized common waveform is transmitted, for a given time duration, from multiple cells. The synchronized multi-cell transmissions are combined over-the-air leading to improved signal reception, e.g., with little or no interference when compared to a single-cell transmission at a user equipment (UE), such as UE 210 of FIG. 2.

Figure 2:
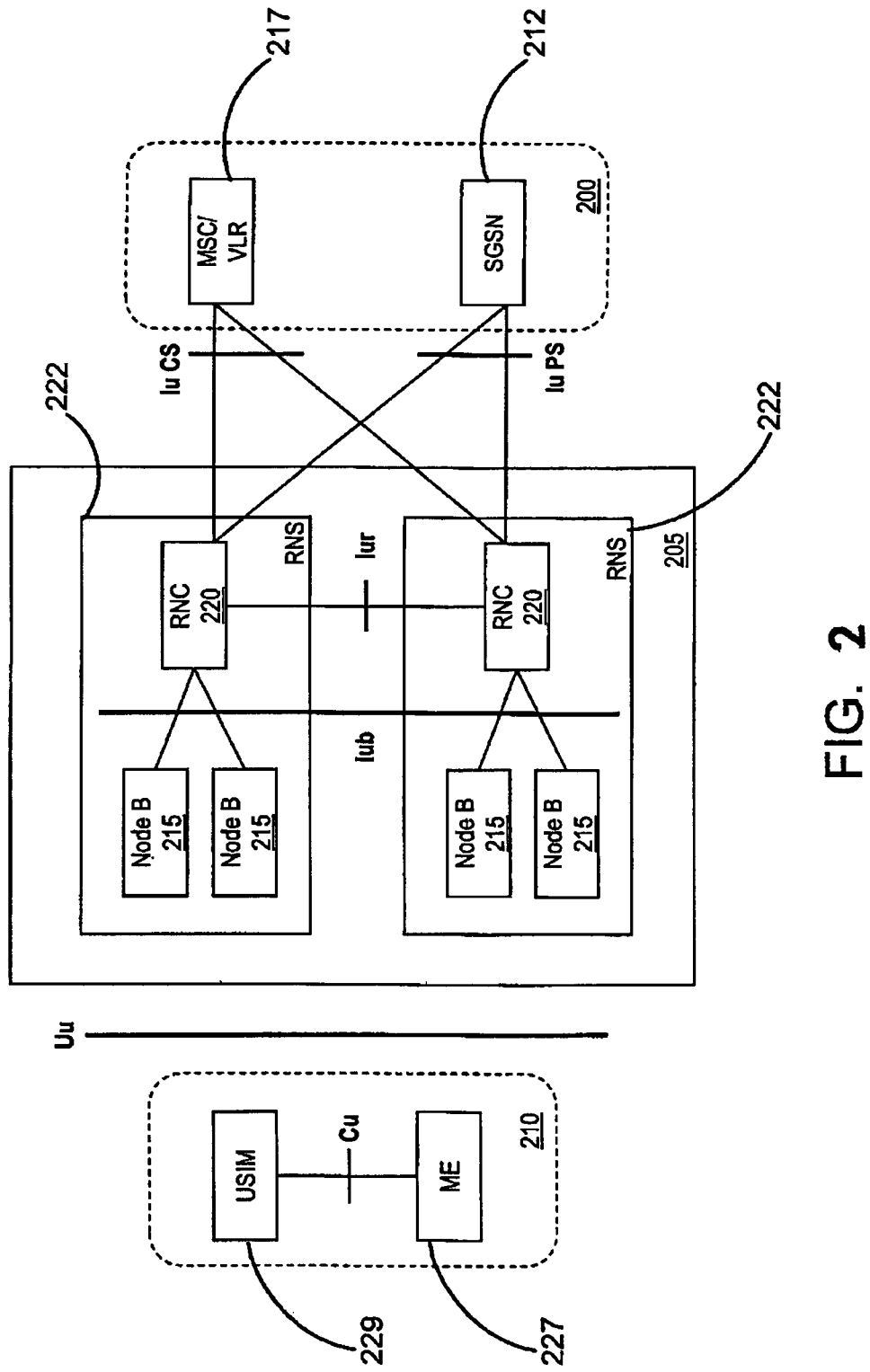
FIG. 2 is a block diagram of an example universal mobile telecommunication system (UMTS), where multicast/broadcast single frequency network (MBSFN) subframes allocation may be applied.

FIG. 2 is a block diagram of an example of a universal mobile telecommunication system (UMTS), where multicast/broadcast single frequency network (MBSFN) subframes allocation, according to at least one example implementation, may be applied. In FIG. 2, the UMTS network comprises three interacting domains: a core network (CN) 200, a UMTS terrestrial radio access network (UTRAN) 205, and one or more user equipments (UEs) 210. The CN 200 may provide functions such as switching, routing and transit for user traffic. The CN 200 may include a serving general packet radio service (GPRS) support node (SGSN) 212 and a mobile services switching center/visitor location register (MSC/VLR) 217. The UTRAN 205 may provide an air interface access method for UEs 210. The illustrated UTRAN 205 comprises a plurality of radio network subsystems (RNSs) 222. A RNS comprises at least one node B 215 and a radio network controller (RNC) 220. The UE 210 comprises mobile equipment 227 associated with a universal subscriber identity module (USIM) 229.

The UMTS network of FIG. 2 also comprises one or more UEs 210 that communicate with the node B 215. A node B 215 includes radio frequency transmitter(s) and receiver(s) used to communicate directly with UEs 210, or mobile stations. The node B may utilize a multiple input multiple output (MIMO) antenna system. For example, the node B 215 may provide transmitting and receiving capabilities with a MIMO antenna system. The MIMO antenna system supports the parallel transmission, and/or the parallel reception, of independent data streams to achieve high data rates. The node B 215 and the UEs 210 may communicate using Wideband Code Division Multiple Access (WCDMA), Orthogonal Frequency Division Multiplexing (OFDM), Single Carrier Frequency Division Multiple Access (FDMA) (SC-FDMA), and/or the like. In an example implementation, both the uplink and the downlink may utilize WCDMA. Although the description herein provides example implementations within the context of specific technologies and/or standards, these technologies and standards are only exemplary, as the subject matter described herein may be used with other technologies and/or standards.

Figure 3:
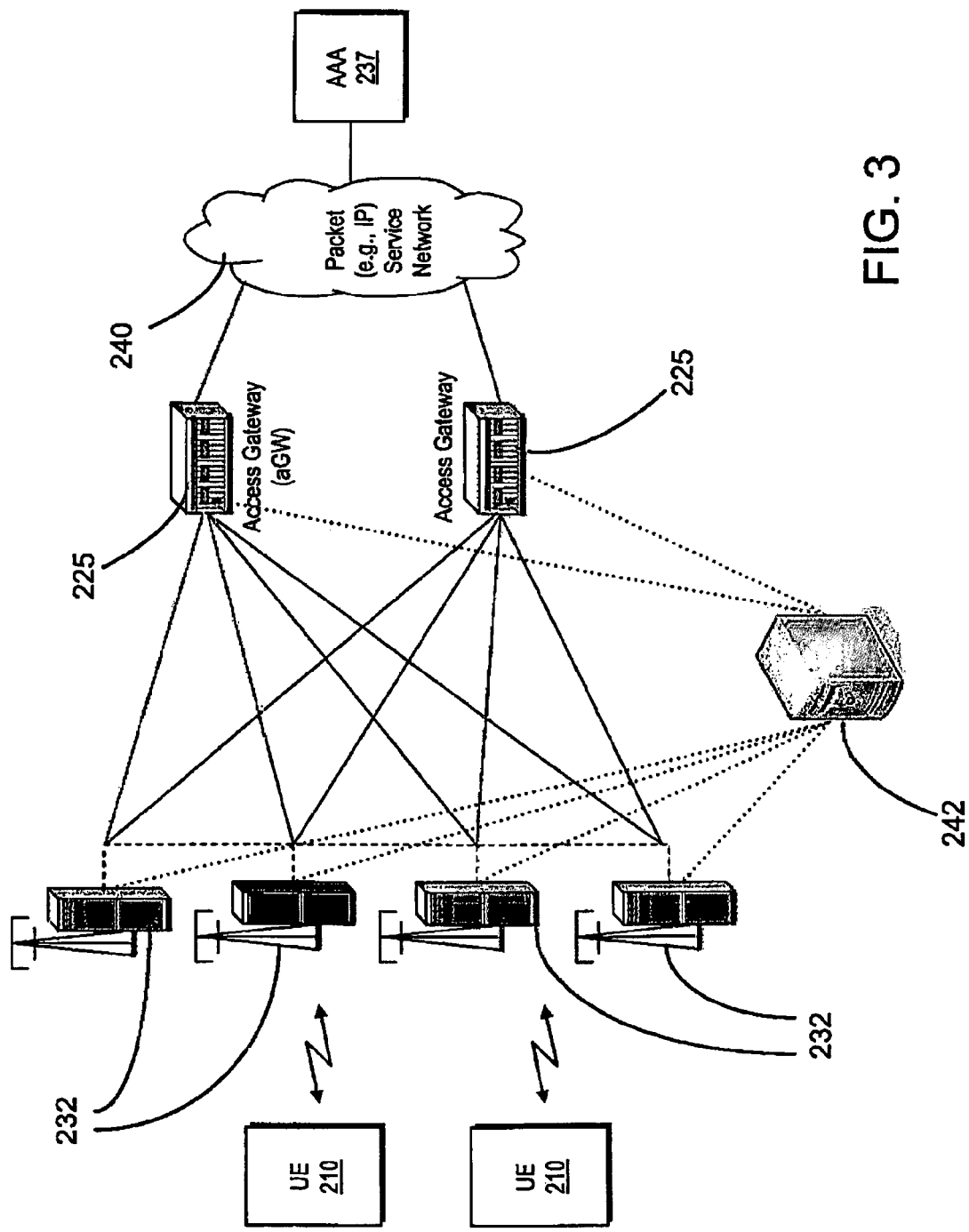
FIG. 3 is a diagram of an example $3^{rd}$ generation long term evolution (LTE) network where MBSFN subframes allocation may be applied.

FIG. 3 is a diagram of an example $3^{rd}$ generation long term evolution (LTE) network where MBSFN subframes allocation, according to at least one example implementation, may be applied. Access gateways (aGWs) 225 may be connected to enhanced node Bs (eNBs) 232 in a full or partial mesh configuration using tunneling over a packet transport network (e.g., an IP network). The aGWs 225 may perform one or more of the following example functions; distribution of paging messages to the eNBs 232, IP header compression, termination of user plane (U-plane) packets for paging reasons, switching of U-plane for support of user equipment mobility and/or the like. Since the aGWs 225 serve as a gateway to external packet service networks 240, e.g., the Internet or private consumer networks, an access, authorization and accounting system (AAA) 237 may be used to determine securely the identity and privileges of a user and to track each user's activities. A multi-cell coordination entity (MCE) 242 may interact with the eNBs 232 and the aGWs 225 in order to coordinate MBSFN transmissions. More particularly, the MCE 242 may be used to allocate radio resources used by the eNBs 232 in the MBSFN area for multi-cell MBMS transmissions using MBSFN operations.

MBMS may be provided either on a dedicated MBMS frequency layer or on a mixed layer, e.g., a mixed carrier. On a mixed carrier, single-cell transmission comprising unicast content may be time-multiplexed with MBSFN transmission on the same frequency layer. The time multiplexing is usually applied at the subframes level. Different subframes, for example allocated either to unicast transmission or to MBSFN transmission of one or more multicast channels (MCHs), may be multiplexed within radio frames. A stream of radio frames is transmitted by eNBs 232 in an example 3G LTE network or node Bs 215 in an example UMTS network to one or more UEs 210. Multiple eNBs 232, for example, transmit the same MBSFN content, e.g. MBSFN subframes, in a synchronized manner. One or more eNBs 232, for example, transmitting MBSFN subframes use the same subframes allocation scheme.

Figure 4:
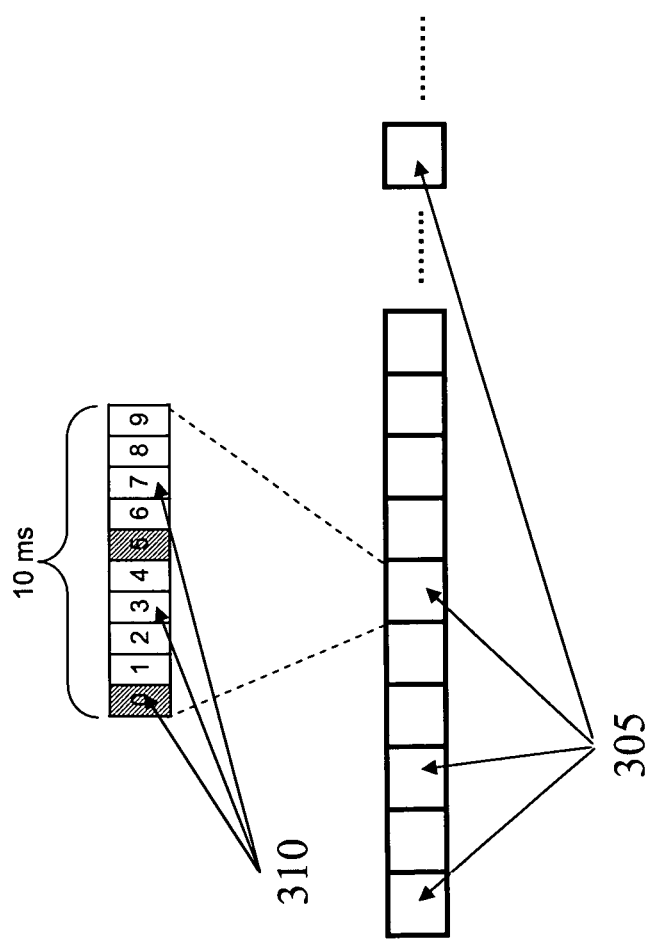
FIG. 4 shows a diagram illustrating example radio frames and subframes in a data stream.

FIG. 4 shows a diagram illustrating example radio frames 305 and subframes 310 in a data stream. In 3GPP LTE, a radio frame 305 has a fixed time duration of, for example, 10 ms. In such a case, a radio frame 305 comprises ten subframes 310. In the illustrated example, a subframe 310 has a fixed time duration of, for example, 1 ms. In an example implementation, subframe number 0 and subframe number 5 are reserved to carry system information associated with unicast transmission. Subframe number 0 and subframe number 5 may also carry unicast data, but in an example implementation may not be used as MBSFN subframes. Although the examples described herein refer to specific time durations, the subject matter described herein may not be restricted by specific time durations for radio frames or subframes. The duration of radio frame 305 and the number of subframes 310 within a radio frame 305 may be defined differently based at least in part on, for example, the architecture of a communication network or the requirements of a communication standard protocol.

The structure of MBSFN subframes may differ from the structure of other subframes such as, for example, unicast subframes. The difference in subframe structures may be in terms of, for example, cyclic prefix and reference signals.

It may be desirable to inform one or more UEs 210, receiving data associated with one or more services, about subframes, in a radio frame, that are MBSFN subframes. Prior knowledge of the subframe structure allows a UE 210 to properly and efficiently decode the subframe 310. In addition, only a limited part of MBSFN subframes may be used for unicast measurements and therefore it is desirable that UEs 210 distinguish between unicast subframes and MBSFN subframes.

The allocation scheme may be signaled to one or more UEs over a broadcast channel (BCCH). In one aspect, MBSFN subframes allocation is defined over an allocation time period T (also referred to as repetition period). The duration of the allocation period T may be defined differently, for example for different networks, different services, different time periods and/or the like. In an example implementation, the allocation period may have a time duration between 10 and 320 ms. In an example implementation, the signaling of the allocation scheme to UEs 210 may be performed periodically, for example with time period equal to T. In another example implementation, the signaling may be performed multiple times within a period T. In yet another example implementation, the signaling may not be performed in each allocation period T. If the MBSFN subframe allocation remains unchanged, it may follow a repetitive pattern with periodicity T. In one example implementation, the subframes allocation scheme may change at one point of time and then remains unchanged over one or more allocation periods T.

Some of the factors that may be considered in designing an allocation scheme comprise flexibility in allocating MBSFN subframes, efficient signaling, power saving optimization for UEs 210, the delay caused by MBSFN subframes to unicast traffic, and/or the like.

Multicast channels (MCHs) may be transmitted by an enhanced base station (eNB) 232 to UEs 210. Different MCHs may possibly have different radio resource requirements, e.g., in terms of MBSFN subframes per unit time. The MBSFN subframes allocation to a given MCH may be defined by a MCH Subframe Allocation Pattern (MSAP). The subframes allocation may be coordinated over the cells within the MBSFN area. Flexibility in the allocation of MBSFN subframes may allow satisfying, for example, scheduling requirements or radio resource requirements of different MCHs and/or different base stations (eNBs) 232. The flexibility of allocating MBSFN subframes may also be desirable, for example to some degree, in order to handle the allocation of MBSFN subframes to subframes 310 previously allocated to unicast subframes at the start of a MBSFN transmission; the allocation of unicast subframes to subframes previously allocated to MBSFN subframes at the end of a MBSFN transmission; and/or the dynamic allocation of MBSFN and unicast subframes.

It may also be desirable that the MBSFN subframe allocation may be efficiently signaled to UEs 210. Because the allocation of MBSFN subframes may be signaled periodically, for example with periodicity T, the number of bits for signaling the subframe allocation to UEs 210 affects the efficiency of the signaling. In order to efficiently use bandwidth, it is desirable that the signaling of the MBSFN subframe allocation would use as few bits as possible.

From a power-saving point of view, it may be desirable to allocate MBSFN subframes contiguously. However, the allocation of many contiguous MBSFN subframes may introduce systematic unicast delays. In one example implementation, it may be desirable to optimize the allocation of unicast subframes, in the form of chains, or paths, of unicast subframes, in a way to avoid undesirable delays in unicast data transmission.

Figure 5:
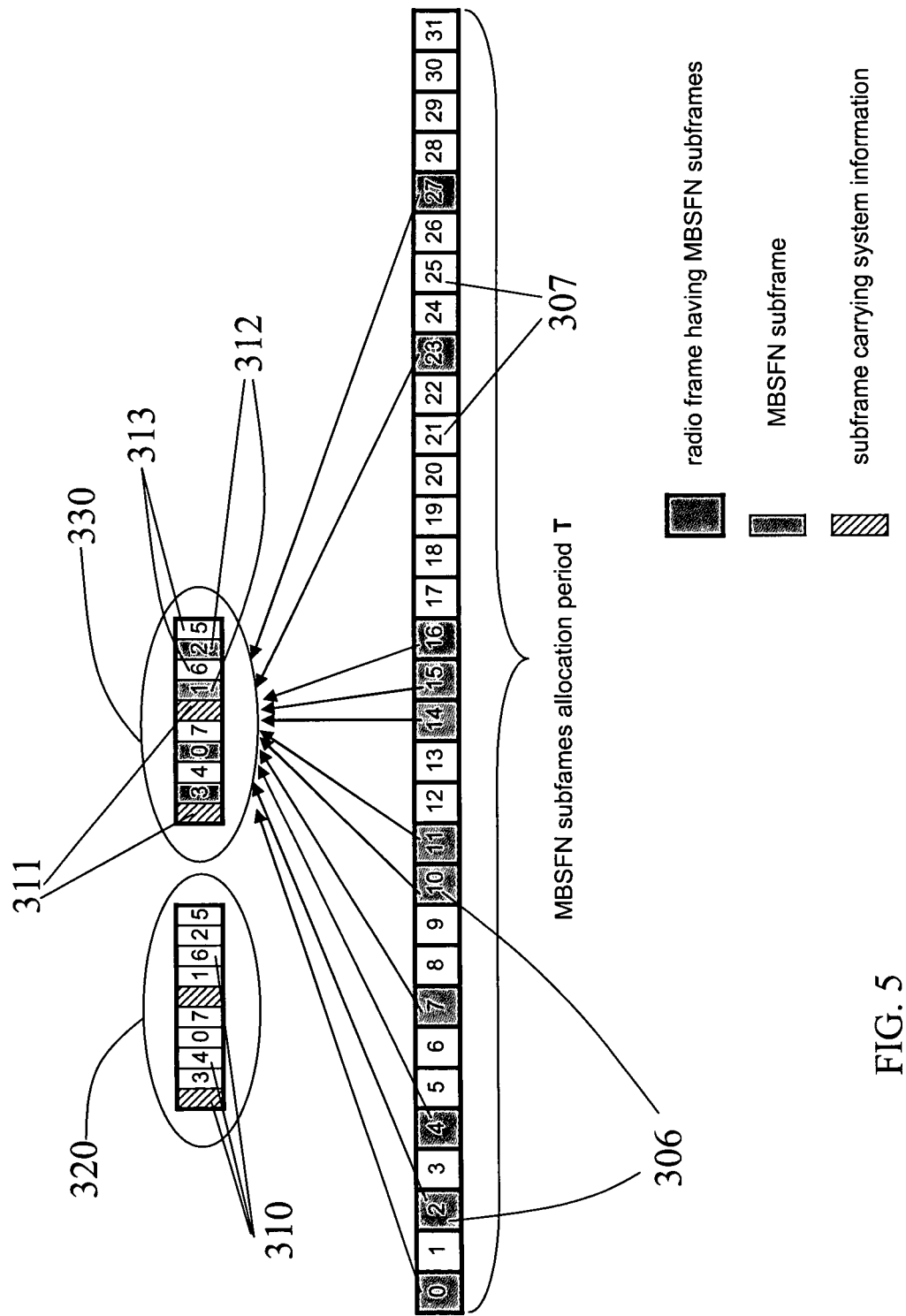
FIG. 5 shows an example of MBSFN subframes allocation using a subframes allocation pattern with a single radio frame.

FIG. 5 shows an example of MBSFN subframes allocation using an allocation order 320 for a single radio frame. FIG. 5 describes a two-level subframes allocation scheme. In an example two-level subframes allocation scheme, MBSFN radio frames 306, e.g., comprising MBSFN subframes 312, are allocated on a macro level. MBSFN subframes 312 within allocated radio frames are allocated on a micro level. On the macro level, MBSFN radio frames 306, e.g. frames comprising MBSFN subframes 312, are allocated or assigned within a repetition period T. In allocating MBSFN radio frames, any number and any combination of MBSFN radio frames 306 within the repetition period may be possible. In the example implementation of FIG. 5, the MBSFN radio frames 306 are the frames numbered 0, 2, 4, 7, 10, 11, 14, 15, 16, 23 and 27. The other frames are unicast radio frames 307. Although an allocation order is described, the micro-level allocation may be signaled using a bitmap covering either one or more consecutive radio frames (e.g., four radio frames as described below with respect to 330A at FIG. 6). Moreover, the macro-level allocation may be implemented using other approaches as well, such as by specifying a period and offset consistent with 3GPP TS 36.331 version 8.1. For example, the first radio frame of a basic period may be defined to occur when the System Frame (i.e., a radio-frame) Number satisfies the following: SFN mod Period=Offset, where Period is in {1, 2, 4, 8, 16, 32} and Offset is in {0, ..., 7}, and the choice of Period and Offset are signaled. Furthermore, more than one set of Period, Offset, Subframe bitmap may be signaled in accordance with MBSFN allocations specified by 3GPP TS 36.331 version 8.1.

On the micro level, MBSFN subframes are assigned within MBSFN radio frames according to a subframes allocation pattern 330. The subframes allocation pattern 330 may correspond to one MBSFN radio frame 306, e.g. the basic allocation period. The subframes allocation pattern 330 may be defined or identified using an allocation order 320 and a number. In some implementations, the allocation order 320 is predetermined (e.g., know to the user element and/or base station), but the number may be signaled to user element and/or base station. In an example implementation, the number indicates the number of MBSFN subframes 312 in the subframes allocation pattern 330. The allocation order 320 is a priority order of the subframes 310 that may carry MBSFN transmission data, e.g., in FIG. 5, 8 subframes after excluding subframes 311 reserved to carry system information associated with unicast transmission. For example, a subframe 310 with higher priority would be assigned to carry MBSFN transmission data before a subframe 310 with lower priority. In an example implementation, the allocation order or priority order 320 may be specified by assigning indices to the subframes that may carry MBSFN data transmission. The indices may be defined so that different network entities, e.g., eNBs 232, different UEs 210, different network servers, e.g., MCE 242, interpret the indices in the same way. In the example of FIG. 5, the indices run from 0 to 7, e.g. corresponding to the 8 subframes that may be assigned as MBSFN subframes, e.g. after excluding subframes 311 reserved to carry system information. A smaller index means, in the example of FIG. 5, a higher priority.

In the same example, if the number of MBSFN subframes 312, for a subframes allocation pattern 330, is 4 then the subframes indexed 0, 1, 2 and 3, in FIG. 5, are the allocated MBSFN subframes 312. The subframes 311 with diagonal mesh, also numbered 0 and 5 in FIG. 4, are reserved to carry system information associated with unicast transmission. The subframes 313 are unicast subframes.

In the example of FIG. 5, the number of allocated MBSFN subframes, within a subframes allocation pattern 330 of one frame, may be signaled using 3 bits, by one network entity to one or more other network entities, one or more UEs and/or the like. For example a number from 0 to 7 may be used to indicate the highest index, e.g., according to indices in the allocation order 320, of a MBSFN subframe 312. The MBSFN radio frames 306 may be signaled using a bitmap of a specific length. In one example implementation, one bit may map to one radio frame. For example, for a repetition period equal to 320 ms, e.g., T=320 ms, the bitmap may have 32 bits corresponding to 32 radio frames 310. The radio-frame level allocation may be assumed to repeat itself with a period T, for example T=320 ms. The repetition may last for one or more allocation periods. For a single frame allocation pattern 330, MBSFN radio frames have the same subframes allocation, at least over a time period equal to one or more repetition periods.

Figure 6:
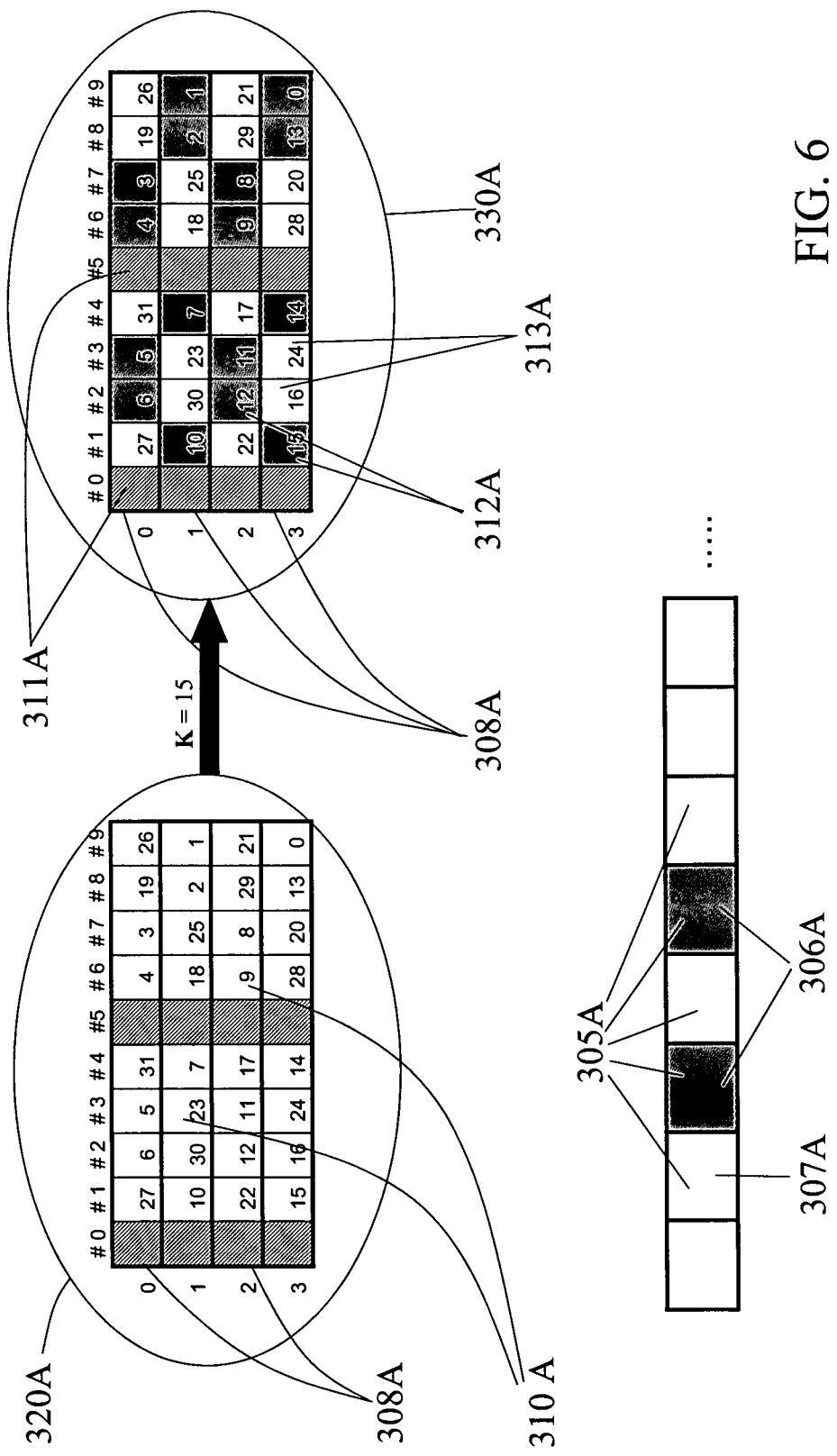
FIG. 6 shows an example of a subframes allocation pattern with four radio frames.

FIG. 6 shows an example of a subframes allocation pattern 330A with multiple radio frames. The subframe allocation pattern 330A defines the allocation of MBSFN subframes over more than one radio frame. The basic subframes allocation period, e.g. the duration of the allocation pattern 330A, comprises more than one radio frame 305A. In the example implementation of FIG. 6, the basic allocation period is four radio frames 305A. For example, each row of the allocation pattern 330A may map to certain radio frames. Among the four radio frames in the basic allocation period, in this example there are 32 subframes that may be assigned or allocated as MBSFN subframes 312A, e.g. after excluding 8 subframes 311A reserved for system information shown with diagonal mesh in FIG. 6, although other quantities of subframes (e.g., 24) may be used as well. As such, the allocation pattern 330A is used to reserve MBSFN subframes in a period of more than one radio frame and, in this example, four radio frames. In some implementations, an allocation order 320A is specified by assigning indices to the subframes 310A that may carry MBSFN transmission data, although a subframe-level bitmap spanning four consecutive radio frames may be used as well.

According to an example implementation, a subframe 310A with a smaller index, in the allocation order 320A, has higher priority of being assigned or allocated as MBSFN subframe 312A, than a subframe 310A with a greater index. For example, if the total number of MBSFN subframes 312A within the subframes allocation pattern 330A is equal to K+1, then the subframes whose indices, e.g. according to the allocation order 320A, are less than or equal to K represent the MBSFN subframes 312A in the subframes allocation pattern 330A. For an allocation pattern with four radio frames, for example, K may be any integer from 0 to 31. In the example of FIG. 6, where the basic allocation period is 4 frames and the subframes allocation pattern 330A comprises 16 MBSFN subframes 312A, e.g., K=15, the subframes 310A indexed 0 to 15, e.g., shown in gray in FIG. 6, are assigned for MBSFN subframes 312A.

In another example implementation, allocation order 320A may be defined so that subframes 310A with higher indices are the first to be allocated or assigned as MBSFN subframes 312A, e.g., have higher priority. In yet another example implementation, an allocation order 320A may be defined with a mapping rule that maps a number K to each possible allocation pattern 330A.

The above-described example values for basic allocation period, e.g., four frames, allocation or repetition period, e.g., T=320 ms, number of MBSFN subframes within an allocation pattern, e.g., K+1=16, and or the like are stated for illustration purpose and are not to be understood or interpreted in a restrictive sense.

In an example implementation, the signaling of the MBSFN subframes' allocation to one or more UEs and/or one or more network elements may be achieved by signaling a bitmap indicating MBSFN radio frames and an integer K. The allocation order may be, for example, stored within one or more network servers, one or more network elements, one or more UEs 210, and/or the like. The allocation order 320 or 320A may be stored within the network entities and UEs 210. In such a case, there is no additional benefit to signal the allocation order 320 or 320A to the network entities or UEs.

Figure 7:
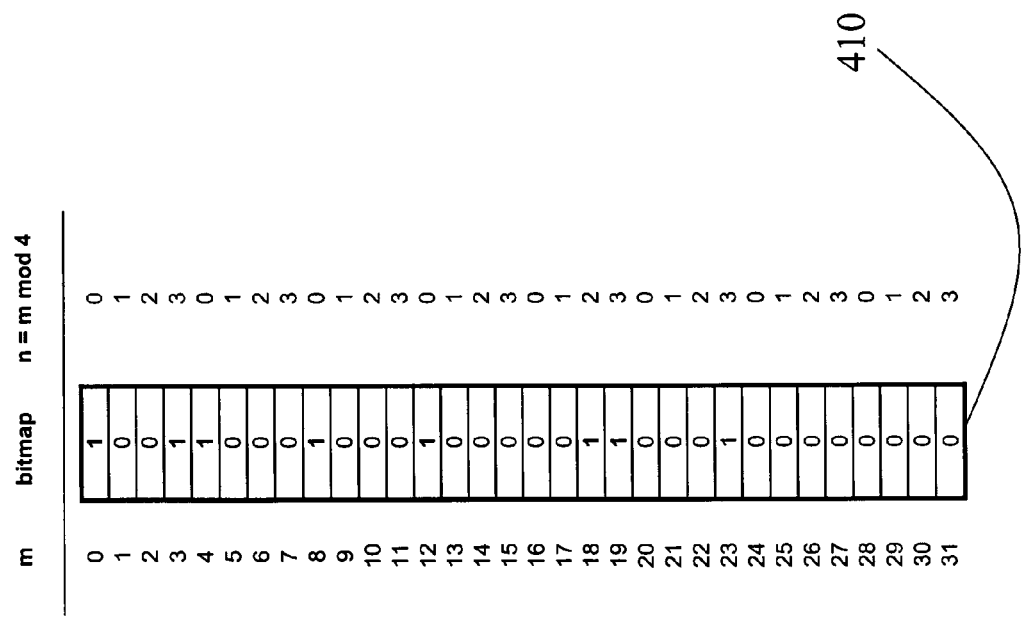
FIG. 7 shows an example of a bitmap indicating MBSFN radio frames within an allocation period.

FIG. 7 shows an example of a bitmap 410 indicating MBSFN radio frames 306A within an allocation period. The bitmap 410 of FIG. 7, corresponding to an allocation period T, for example T=320 ms, has M bits, for example M=32. In an example implementation, each bit, in the bitmap 410, may correspond to a single radio frame 308A in the allocation period. Radio frames 305, within the allocation period, and bits, within a corresponding bitmap 410, may be numbered, or indexed, from 0 to M−1. If radio frame 305A number, or with index, m is indicated within the bitmap to be an MBSFN radio frame 306A, the subframes allocation within the same radio frame corresponds to the radio frame 308A number n=m mod r in the allocation pattern 330A, where mod represents the mathematical modulo operation and r represents the number of radio frames 308A in the basic allocation period or in the allocation pattern 330A (for example r=4 in FIG. 6). As illustration, in the example of FIG. 7, radio frame number 19 with, m=19, has a value of 1 in the bitmap indicating that frame number 19 is an MBSFN radio frame. The m mod 4 value for radio frame 19 is 3, which means that the subframes allocation in radio frame 19 is similar to the subframes allocation in frame number 3 of the allocation pattern 330A. Although FIG. 7 depicts an implementation of assigning portions (e.g., rows of allocation pattern 330A), other approaches may be used as well. For example, the rows of allocation pattern 330A (labeled 0, 1, 2, and 3) may be assigned to consecutive radio frames all configured to carry MBSFN subframes.

Figure 8:
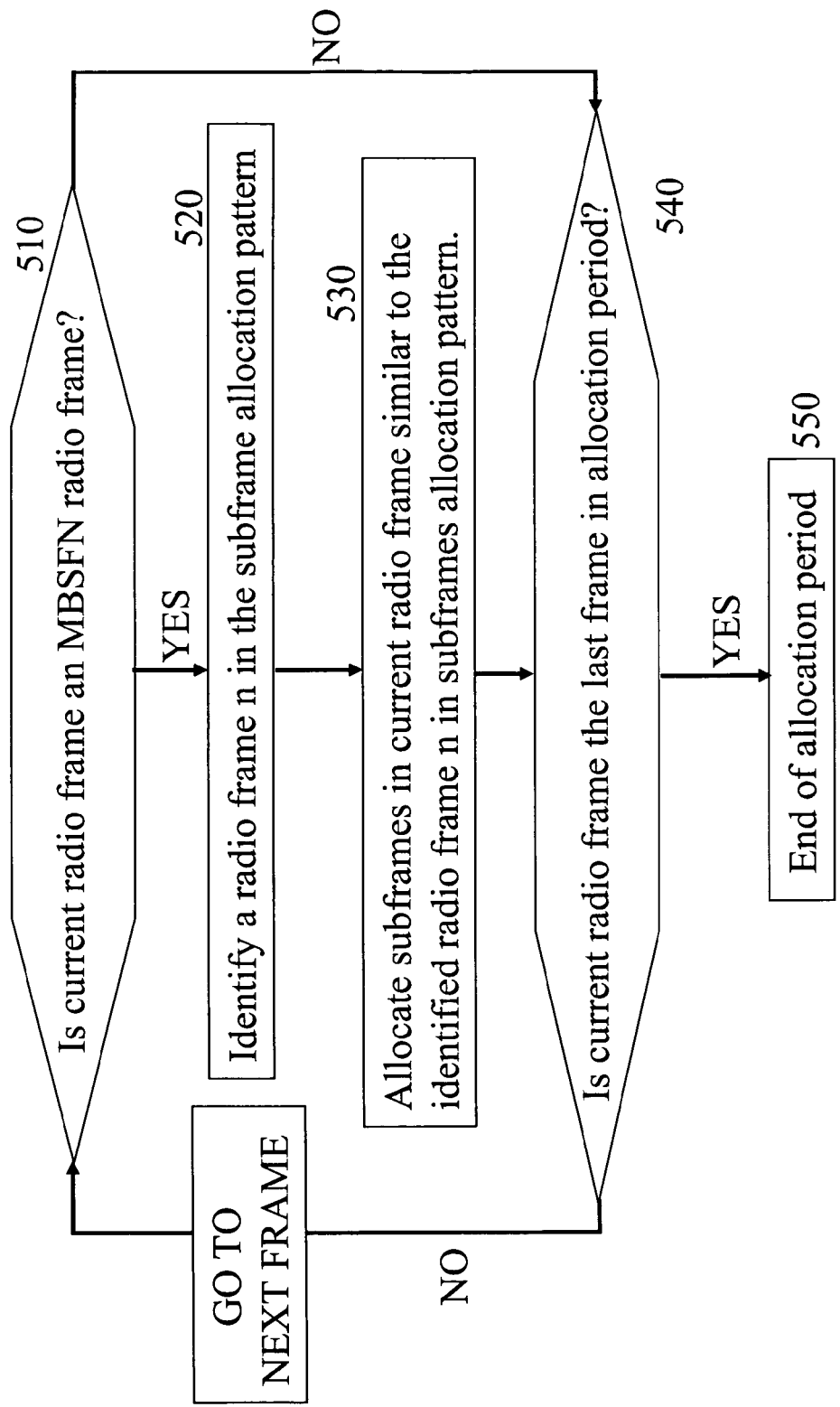
FIG. 8 illustrates a method of allocating MBSFN subframes.

FIG. 8 illustrates a method of allocating MBSFN subframes. In an example implementation, the method of FIG. 8 is executed by a network element, e.g. eNB 232 of FIG. 3, upon receiving data subframes 315A from one or more other network elements, although other elements of the network of FIG. 3 may perform one or more aspects of the execution.

At block 510, a determination is made as to whether current frame 305A, e.g., frame number m in current allocation period, is an MBSFN radio frame 306A. In an example implementation, this determination is made by checking a bitmap 410, although other approaches may be used as well as noted above with respect to the description of specifying a period and offset consistent with 3GPP TS 36.331 version 8.1. If it is determined that the current frame 305A is not an MBSFN frame 306A, then the method starting at block 540 may be executed. If it is determined that the current frame 305A is an MBSFN frame 306A, then at block 520, a radio frame 308A in the subframes allocation pattern 330A having the corresponding pattern of subframes allocation is identified. In an example implementation, the index of the radio frame 308A in the subframes allocation pattern 330A is identified by calculating a value n, where n=m mod r, where r is the total number of frames in the subframes allocation pattern 330A. At block 530, subframes 310A in the current radio frame 305A, e.g., radio frame number m, are allocated based at least in part on the subframes allocation in the identified radio frame number n, in the subframes allocation pattern 330A. At block 540, a determination is made as to whether the current radio frame 305A is the last frame within the current allocation period. If current radio frame 305A is the last frame within the current allocation period, then the process of allocating subframes within one allocation period terminates at block 550. Other wise the process starting at block 510 is executed for the next frame in the allocation period. The process described in FIG. 8 may be executed multiple times, e.g. for multiple allocation periods.

Figure 9:
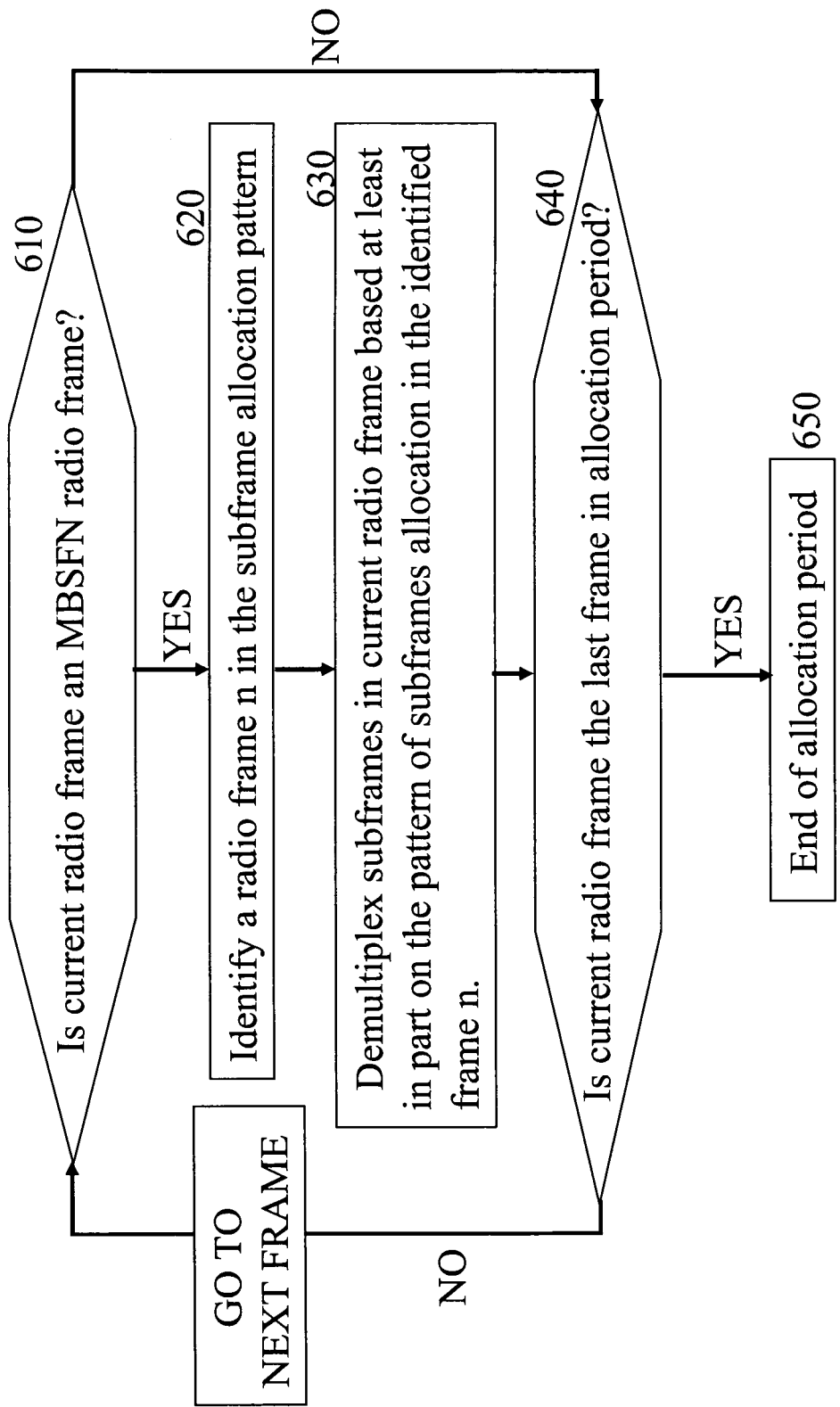
FIG. 9 illustrates a method of demultiplexing MBSFN subframes.

FIG. 9 illustrates a method of demultiplexing MBSFN subframes. In an example implementation, the method of FIG. 9 is executed by user equipment, e.g. UE 210 of FIG. 3, upon receiving data subframes 315A from one or more network elements, e.g. eNB 232 in FIG. 3. Although UE 210 is described as performing the execution, other elements of the network of FIG. 3 may perform one or more aspects of the execution.

At block 610, a determination is made as to whether current frame 305A, e.g., frame number m in current allocation period, is an MBSFN radio frame 306A. In an example implementation, this determination is made by checking a bitmap 410. If it is determined that the current frame 305A is not an MBSFN frame 306A, then the method starting at block 640 may be executed. If it is determined that the current frame 305A is an MBSFN frame 306A, then at block 620, a radio frame 308A in the subframes allocation pattern 330A having the corresponding pattern of subframes allocation is identified. In an example implementation, the index of the radio frame 308A in the subframes allocation pattern 330A is identified by calculating a value n, where n=m mod r, where r is the total number of frames in the subframes allocation pattern 330A. At block 630, subframes 310A in the current radio frame 305A, e.g., radio frame number m, are demultiplexed based at least in part on the subframes allocation in the identified radio frame number n, in the subframes allocation pattern 330A. At block 640, a determination is made as to whether the current radio frame 305A is the last frame within the current allocation period. If current radio frame 305A is the last frame within the current allocation period, then the process of demultiplexing subframes within one allocation period terminates at block 650. Otherwise, the process starting at block 610 is executed for the next frame in the allocation period. The process described in FIG. 8 may be executed multiple times, e.g. for multiple allocation periods.

In an example implementation, demultiplexing may be achieved by receiving a radio frames and re-arranging subframes into one or more data streams, e.g. one or more unicast data streams and/or one or more MBSFN data streams. In another implementation, demultiplexing may be achieved by receiving only subframes associated with one or more services. In order to receiving subframes associated with one or more services, a UE 210 may switch its receiver on and off based at least in part on the subframes allocation scheme.

In an example implementation, allocation order 320A may be stored in one or more UEs 210, one or more network elements, for example eNBs 232, one or more network servers, for example MCE 242. The bitmap and the number K indicating number of MBSFN subframes 312A in allocation pattern 330A may be generated, or decided, by a network server, for example MCE 242, and signaled to one or more network element, for example eNBs 232, and one or more UEs 210. The signaling may be performed repetitively, for example with period T, or once each time a change is made either to bitmap or to K.

In an example implementation, a network server, e.g. MCE 242, may create or modify a bitmap and/or define or modify a number K. In an example implementation, the network server may signal the bitmap and/or K to one or more network elements and/or one or more UEs 210. In another example implementation, the network server may generate or modify one or more allocation patterns and signal the allocation pattern(s) to network element(s) and/or UE(s).

Figure 10:
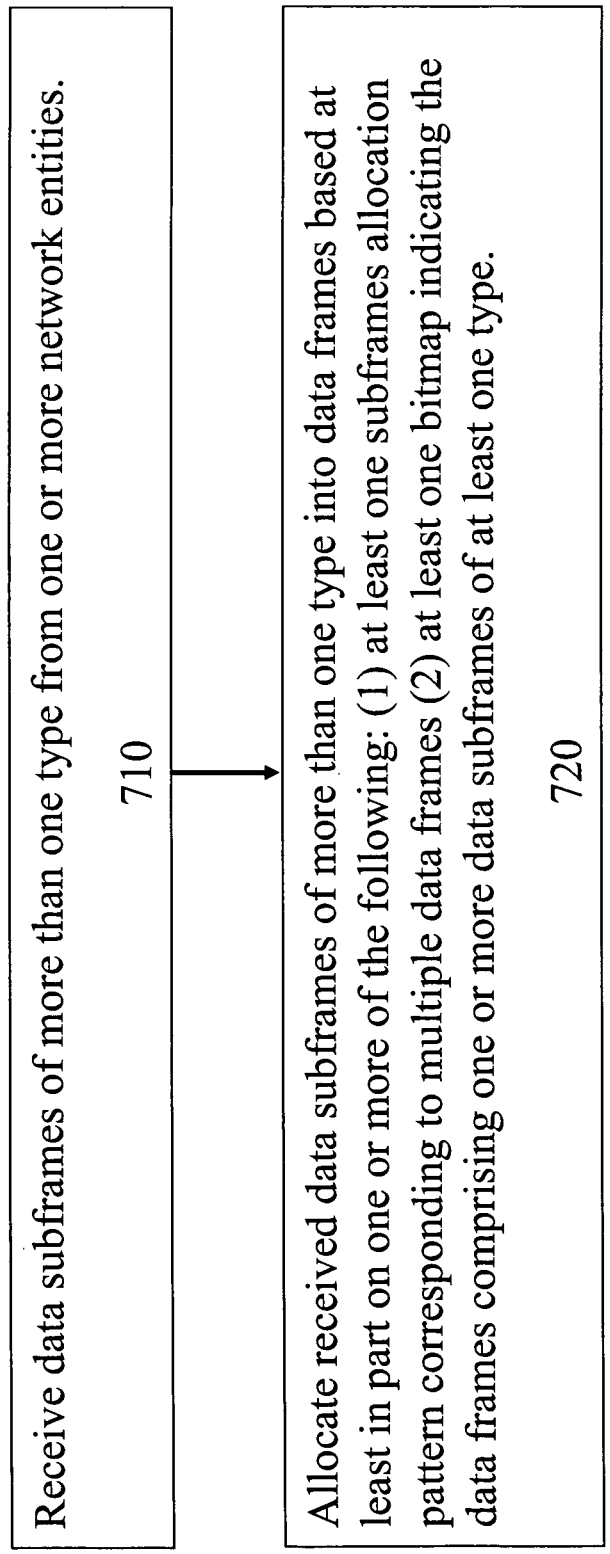
FIG. 10 illustrates a method of allocating data subframes of more than one type within data frames of a data stream.

FIG. 10 illustrates a method of allocating data subframes of more than one type within data frames of a data stream according. The example of FIG. 10 may be applied to various applications involving data subframes allocation.

At block 710, data subframes of different types received. In an example implementation, the data subframes are received from one or more network entities. In an example implementation depicted at FIG. 10, the received data subframes may be allocated, or multiplexed, within data frames of a data stream or scheduled for transmission in an interleaving way. At block 720, the received data subframes of more than one type are allocated into data frames based at least in part on one or more subframes allocation patterns 330A and/or at least one bitmap. In an example implementation, the allocation is performed by a network element. In an example implementation, one allocation pattern may be associated with each type of data subframes. In another example implementation, the network element may generate multiple allocation patterns 330 using one allocation order 320 and multiple numbers. The multiple numbers may be interpreted by the network element, for example using a mapping rule, as corresponding to multiple subframes allocation patterns associated with multiple subframes types. At least one bitmap (or possibly other form of information) may provide information on data frames where a subframes allocation is to take place.

Figure 11:
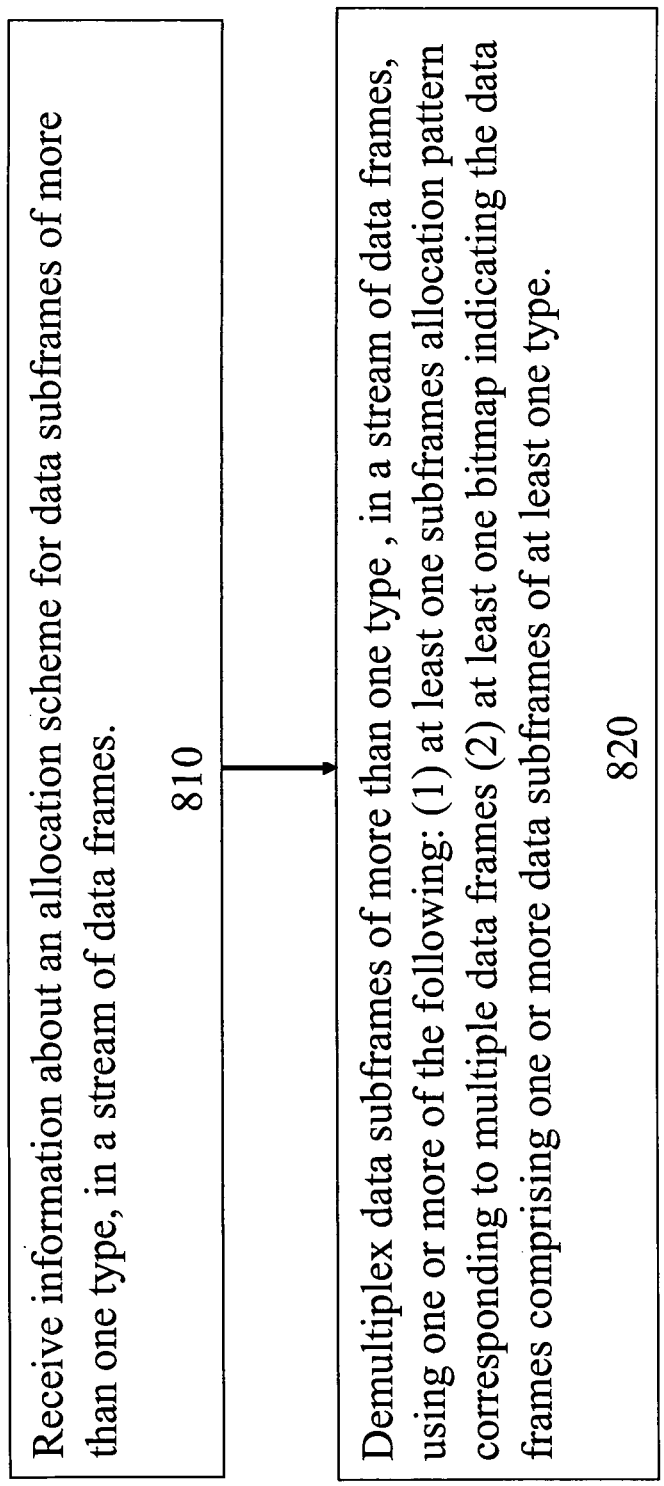
FIG. 11 illustrates a method of demultiplexing data subframes of more than one type within data frames of a data stream.

FIG. 11 illustrates a method of demultiplexing data subframes of more than one type within data frames of a data stream. The example of FIG. 11 data subframes may be of different types.

At block 810, information about a subframes allocation scheme associated with a stream of data frames is received. In an example implementation, the information is received by UE 210 (FIG. 2). If the UE 210 is interested in part or all of the data in the stream of data frames, the UEs may tune its receiver to start receiving data frames. In an example implementation, the UE 210 may be interested in receiving only MBSFN subframes. In an example implementation, the UE 210 may be interested in receiving only unicast subframes. At block 820, the UE 210 may use at least one bit map, or any other form of information, to get information about data frames comprising subframes of one or more types.

If desired, in addition or alternatively, UE 210 may use one or more subframes allocation patterns to demultiplex data subframes of one or more types. The demultiplexing, in an example implementation, may be performed by receiving one or more data frames and separating subframes of different types into one or more streams.

In another example implementation, the UE 210, may switch its receiver on and off in a way to receive data subframes of specific type(s). The switching of the receiver may be performed based on the bitmap(s) and allocation pattern(s), which indicate where subframes of each type are allocated in the stream of data frames. In one example implementation, one allocation pattern may be associated with each type of data subframes. In another example implementation, the network element may generate multiple allocation patterns 330A using one allocation order 320A and multiple numbers. The multiple numbers may be interpreted by the network element, for example using a mapping rule, as corresponding to multiple subframes allocation patterns associated with multiple subframes types. At least one bitmap, or possibly other form of information, may provide information on data frames where a subframes allocation is to take place.

In an example implementation, one or more of the methods described in FIGS. 5 to 11 may be implemented in at least one of software, application logic, and/or hardware, or a combination thereof.

In accordance with an example implementation, there may be provided an apparatus including a memory unit configured to store one or more subframes allocation patterns with a basic allocation period corresponding to multiple data frames, and information indicating data frames comprising at least one data subframe of at least one type. The apparatus may further include a receiver configured to receive data subframes of more than one type, and a processor configured to allocate the data subframes into data frames based at least in part on at least one of the one or more subframes allocation patterns, and information indicating data frames including at least one data subframe of at least one type.

In accordance with an example implementation, there is provided a method including receiving data subframes of more than one type, and allocating the data subframes into data frames based at least in part on at least one of one or more subframes allocation patterns with a basic allocation period corresponding to multiple data frames, and information indicating data frames comprising at least one data subframe of at least one type.

In accordance with an example implementation, there is provided an apparatus including a memory unit configured to store one or more subframes allocation patterns with a basic allocation period corresponding to multiple data frames, and information indicating data frames comprising at least one data subframe of at least one type. The apparatus may further include a receiver configured to receive data frames, and a processor configured to demultiplex data subframes in the data frames based at least in part on at least one of the one or more subframes allocation patterns, and information indicating data frames comprising at least one data subframe of at least one type.

In accordance with an example implementation, there is provided a method, including receiving data frames with subframes of more than one type allocated in the data frames, and demultiplexing the data subframes in the data frames based at least in part on at least one of one or more subframes allocation patterns with a basic allocation period corresponding to multiple data frames, and information indicating data frames comprising at least one data subframe of at least one type.

In accordance with an example implementation, there is provided a computer program product including a computer-readable storage medium bearing computer program code configured therein for use with a computer, the computer program code including code for receiving data subframes of more than one type, and code for allocating the data subframes into data frames based at least in part on at least one of one or more subframes allocation patterns with a basic allocation period corresponding to multiple data frames, and information indicating data frames comprising at least one data subframe of at least one type.

In accordance with an example implementation, there is provided a computer program product including a computer-readable storage medium bearing computer program code configured therein for use with a computer, the computer program code including code for receiving data frames with subframes of more than one type allocated in the data frames, and code for demultiplexing the data subframes in the data frames based at least in part on at least one of one or more subframes allocation patterns with a basic allocation period corresponding to multiple data frames, and information indicating data frames comprising at least one data subframe of at least one type.

In some implementations, the data subframes of more than one type comprise MBSFN subframes and unicast subframes.

Moreover, in some implementations, the receiver is further configured to receive the information indicating data frames comprising at least one data subframe of at least one type.

In accordance with some implementations, the method may further include receiving the information indicating data frames comprising at least one data subframe of at least one type.

In accordance with an example implementation, the receiver may be configured to receive the one or more subframes allocation patterns.

In accordance with an example implementation, the method may further include receiving the one or more subframes allocation patterns.

In accordance with an example implementation, the memory unit may be configured to store at least one allocation order, the receiver is further configured to receive one or more numbers, and the processor is configured to generate the one or more subframes allocation patterns based at least in part on at least one of the stored at least one allocation order and the received one or more numbers.

In accordance with an example implementation, the method may include storing at least one allocation order, receiving one or more numbers, and generating the one or more subframes allocation patterns based at least in part on at least one of the stored at least one allocation order and the received one or more numbers.

In accordance with an example implementation, an apparatus may be provided. The apparatus may include a memory unit configured to store at least one allocation order corresponding to multiple data frames, and a processor configured to generate one or more numbers, wherein one or more subframes allocation patterns may be generated from the one or more numbers and the at least one allocation order. The processor is further configured to generate information indicating data frames comprising at least one data subframe of at least one type. The apparatus further includes a transmitter configured to transmit the one or more one or more numbers and the information indicating data frames comprising at least one data subframe of at least one type.

Without in any way limiting the scope, interpretation, or application of the claims appearing below, it is possible that in some implementations a technical advantage of one or more of the example implementations described herein may be flexibility in allocating subframes on a mixed carrier. Another possible technical advantage of one or more implementations disclosed herein may be efficient signaling of a subframes allocation scheme. Another technical advantage of one or more implementations disclosed herein may be subframes allocation schemes allowing power savings by user equipments.

The subject matter described herein may be implemented in software, hardware, application logic or a combination of software, hardware and application logic. The software, application logic and/or hardware may reside on one or more network servers, one or more network element and/or one or more user equipments (e.g., mobile devices, computers, and/or the like). If desired, part of the software, application logic and/or hardware may reside on user equipment, part of the software, application logic and/or hardware may reside on network server, and part of the software, application logic and/or hardware may reside on a network element. The application logic, software or an instruction set is preferably maintained on any one of various conventional computer-readable storage media. In the context of this document, a "computer-readable medium" can include a storage media or any other means that can contain, store, communicate, propagate or transport the instructions for use by or in connection with an instruction execution system, apparatus, or device.

Moreover, the subject matter described herein may be embodied in systems, apparatus, methods, and/or articles depending on the desired configuration. For example, the base stations (e.g., eNB) and user elements (or one or more components therein) and/or the processes described herein may be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. Similarly, systems are also described herein that may include a processor and a memory coupled to the processor. The memory may include one or more programs that cause the processor to perform one or more of the operations described herein.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims. It is also noted herein that while the above describes exemplifying embodiments of the invention, these descriptions should not be viewed in a limiting sense. Rather, there are several variations and modifications that may be made without departing from the scope of the present invention as defined in the appended claims.

What is claimed is:

1. A method comprising:
    allocating subframes within radio frames transmitted to a user element by at least allocating a first set of subframes into a first radio frame, a second set of subframes into a second radio frame, a third set of subframes into a third radio frame, a fourth set of subframes into a fourth radio frame, wherein the first set of subframes are identified based on at least a first portion of a subframe allocation pattern, the second set of subframes are identified based on at least a second portion of the subframe allocation pattern, the third set of subframes are identified based on at least a third portion of the subframe allocation pattern, and the fourth set of subframes are identified based on at least a fourth portion of the subframe allocation pattern; and transmitting, to the user element, a message comprising an indication of the allocation, the indication representative of the allocation within the subframes of consecutive radio frames, without the indication identifying the radio frames including the allocated subframes and without the indication repeating the subframes allocation of the first radio frame of the plurality of radio frames.

2. The method of claim 1, wherein the subframes include multicast broadcast service single frequency network subframes.

3. The method of claim 1, further comprising:
configuring the subframe allocation pattern with a plurality of portions corresponding to the radio frames.

4. The method of claim 1, further comprising:
configuring the indication to represent the allocation within the subframes of four consecutive radio frames.

5. A method comprising:
receiving, at a user element, a message comprising an indication of a subframe allocation, the indication representative of the subframe allocation within the subframes of consecutive radio frames without the indication identifying the radio frames including the allocated subframes and without the indication repeating the subframes allocation of a first radio frame of the plurality of radio frames, wherein the subframe allocation includes a first set of subframes into the first radio frame, a second set of subframes into a second radio frame, a third set of subframes into a third radio frame, a fourth set of subframes into a fourth radio frame, wherein the first set of subframes are identified based on at least a first portion of a subframe allocation pattern, the second set of subframes are identified based on at least a second portion of the subframe allocation pattern, the third set of subframes are identified based on at least a third portion of the subframe allocation pattern, and the fourth set of subframes are identified based on at least a fourth portion of the subframe allocation pattern; and identifying, at the user element, the subframes allocated in radio frames, the identifying based on the indication.

6. The method of claim 5, wherein the subframes include multicast broadcast service single frequency network subframes.

7. The method of claim 5, wherein the allocation represents subframes within four consecutive radio frames.

8. An apparatus comprising:
at least one processor; and
at least one memory including computer program code, the at least one processor, the at least one memory, and the computer program code configured to cause the apparatus to at least:
allocate subframes within radio frames transmitted to a user element by at least allocating a first set of subframes into a first radio frame, a second set of subframes into a second radio frame, a third set of subframes into a third radio frame, a fourth set of subframes into a fourth radio frame, wherein the first set of subframes are identified based on at least a first portion of a subframe allocation pattern, the second set of subframes are identified based on at least a second portion of the subframe allocation pattern, the third set of subframes are identified based on at least a third portion of the subframe allocation pattern, and the fourth set of subframes are identified based on at least a fourth portion of the subframe allocation pattern; and transmit, to the user element, a message comprising an indication of the allocation, the indication representative of the allocation within the subframes of consecutive radio frames, without the indication identifying the radio frames including the allocated subframes and without the indication repeating the subframes allocation of the first radio frame of the plurality of radio frames.

9. The apparatus of claim 8, wherein the subframes include multicast broadcast service single frequency network subframes.

10. The apparatus of claim 8, wherein the apparatus is further configured to at least configure
the indication to represent the allocation within the subframes of four consecutive radio frames.

11. An apparatus comprising:
at least one processor; and
at least one memory including computer program code, the at least one processor, the at least one memory, and the computer program code configured to cause the apparatus to at least:
receive, at the apparatus, a message comprising an indication of a subframe allocation, the indication representative of the subframe allocation within the subframes of consecutive radio frames without the indication identifying the radio frames including the allocated subframes and without the indication repeating the subframes allocation of a first radio frame of the plurality of radio frames, wherein the subframe allocation includes a first set of subframes into the first radio frame, a second set of subframes into a second radio frame, a third set of subframes into a third radio frame, a fourth set of subframes into a fourth radio frame, wherein the first set of subframes are identified based on at least a first portion of a subframe allocation pattern, the second set of subframes are identified based on at least a second portion of the subframe allocation pattern, the third set of subframes are identified based on at least a third portion of the subframe allocation pattern, and the fourth set of subframes are identified based on at least a fourth portion of the subframe allocation pattern; and
identify, at the apparatus, the subframes allocated in radio frames, the identifying based on the indication.

12. The apparatus of claim 11, wherein the subframes include multicast broadcast service single frequency network subframes.

13. The apparatus of claim 11, wherein the allocation represents subframes within four consecutive radio frames.

14. A non-transitory computer-readable storage medium including instructions to configure a processor to perform operations comprising:
allocating subframes within radio frames transmitted to a user element by at least allocating a first set of subframes into a first radio frame, a second set of subframes into a second radio frame, a third set of subframes into a third radio frame, a fourth set of subframes into a fourth radio frame, wherein the first set of subframes are identified based on at least a first portion of a subframe allocation pattern, the second set of subframes are identified based on at least a second portion of the subframe allocation pattern, the third set of subframes are identified based on at least a third portion of the subframe allocation pattern, and the fourth set of subframes are identified based on at least a fourth portion of the subframe allocation pattern; and transmitting, to the user element, a message comprising an indication of the allocation, the indication representative of the allocation within the subframes of consecutive radio frames, without the indication identifying the radio frames including the allocated subframes and without the indication repeating the subframes allocation of the first radio frame of the plurality of radio frames.

15. The non-transitory computer-readable storage medium of claim 14, wherein the subframes include multicast broadcast service single frequency network subframes.

16. The non-transitory computer-readable storage medium of claim 14, further comprising: configuring the indication to represent the allocation within the subframes of four consecutive radio frames.

17. A non-transitory computer-readable storage medium including instructions to configure a processor to perform operations comprising:

receiving, at a user element, a message comprising an indication of a subframe allocation, the indication representative of the subframe allocation within the subframes of consecutive radio frames without the indication identifying the radio frames including the allocated subframes and without the indication repeating the subframes allocation of a first radio frame of the plurality of radio frames, wherein the subframe allocation includes a first set of subframes into the first radio frame, a second set of subframes into a second radio frame, a third set of subframes into a third radio frame, a fourth set of subframes into a fourth radio frame, wherein the first set of subframes are identified based on at least a first portion of a subframe allocation pattern, the second set of subframes are identified based on at least a second portion of the subframe allocation pattern, the third set of subframes are identified based on at least a third portion of the subframe allocation pattern, and the fourth set of subframes are identified based on at least a fourth portion of the subframe allocation pattern; and identifying, at the user element, the subframes allocated in radio frames, the identifying based on the indication.

18. The non-transitory computer-readable storage medium of claim 17, wherein the subframes include multicast broadcast service single frequency network subframes.

19. The non-transitory computer-readable storage medium of claim 17, wherein the allocation represents subframes within four consecutive radio frames.

\* \* \* \* \*